(No Model.)
M. COLLINS.
FIRE ESCAPE.
No. 282,703. Patented Aug. 7, 1883.
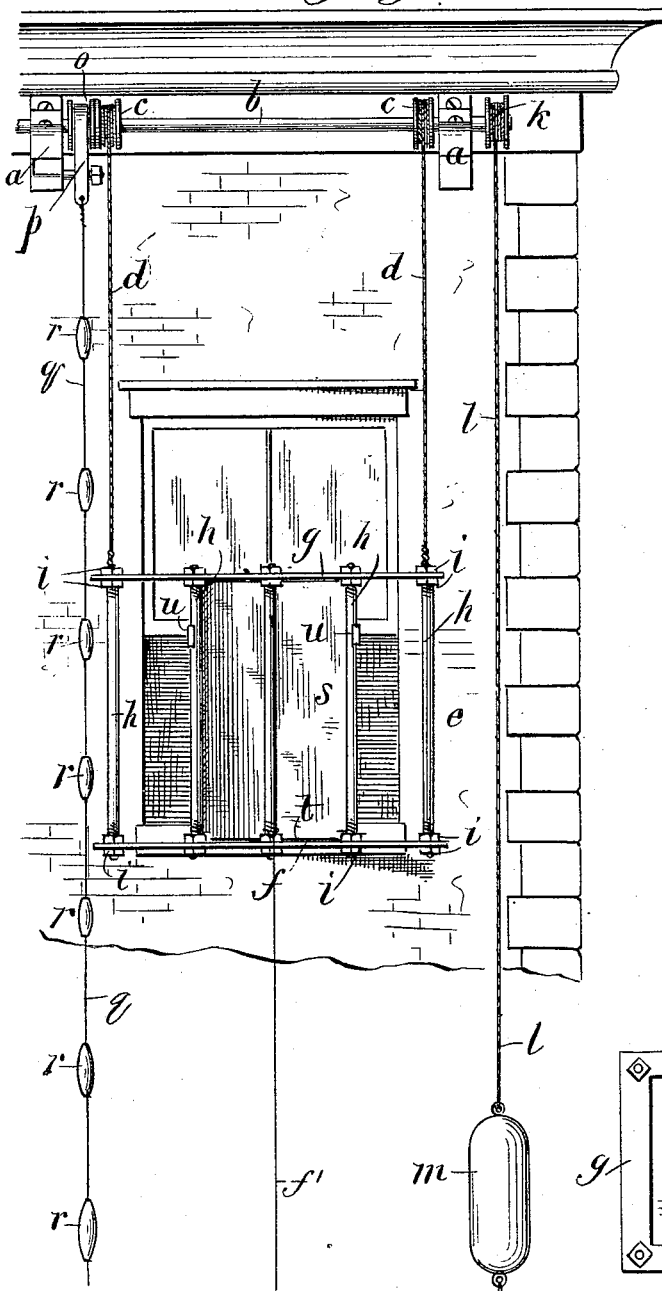
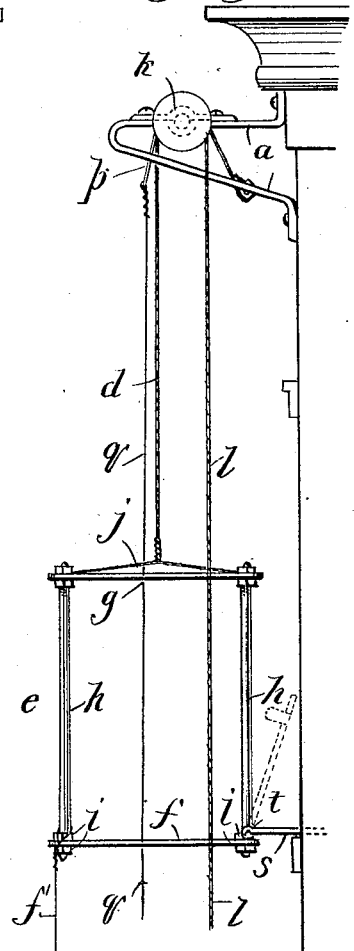
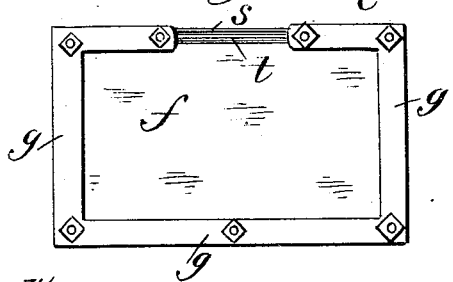
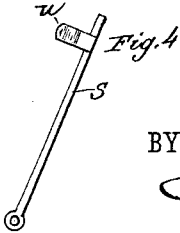
WITNESSES:
INVENTOR:
M. Collins
BY
ATTORNEYS.

UNITED STATES PATENT OFFICE.

MICHAEL COLLINS, OF PITTSFIELD, MASSACHUSETTS.

FIRE-ESCAPE.

SPECIFICATION forming part of Letters Patent No. 282,703, dated August 7, 1883.

Application filed March 8, 1883. (No model.)

*To all whom it may concern:*

Be it known that I, MICHAEL COLLINS, of Pittsfield, in the county of Berkshire and State of Massachusetts, have invented a new and Improved Fire-Escape, of which the following is a full, clear, and exact description.

The object of my invention is to provide a means of escape for the inmates of burning buildings; also the rescue of valuable goods therefrom.

Reference is to be had to the accompanying drawings, forming a part of this specification, in which similar letters of reference indicate corresponding parts in all the figures.

Figure 1 is a front elevation of a building in part with my improved fire-escape applied thereto. Fig. 2 is a side elevation of the same, and Fig. 3 is a plan view of the cage or platform. Fig. 4 is a detail view of the bridge and spring-clamp.

At any convenient point along the front of a building, preferably at the roof coping or cornice, I fix strong bracket-arms $a$, and provide bearings therein for the shaft $b$, to which I fix between the bearings the grooved drums $c$, on which are fixed and wound the ropes or chains $d$, for support of the suspended cage or platform $e$, which I construct of a floor, $f$, and top or roof frame, $g$, connected together by the hollow or solid pipes or bars $h$, which are screw-threaded at both ends, so as to firmly support the frame $g$ and floor $f$ between the pairs of jam-nuts $i$, thus making a light yet substantial construction, with joints of the parts not liable to easily work loose by jars or shocks to which the cage may be subjected in use, and I may connect the ropes or chains $j$, by which the cage is hung from wires $d$ to the frame $g$, in any secure manner at both sides of the cage, as shown, so that the wires hang vertically from the drums $c$ to wind easily thereon.

On the shaft $b$, at a convenient point, I fix the drum $k$, over which is wound the wire rope or chain $l$, from which hangs the weight $m$, which is sufficiently heavy to counterbalance the weight of the cage $e$, or a little heavier than the cage to cause the cage to rise, when empty, by the descent of the weight, the chains $dd$ of the cage and the chain $l$ of the weight being wound reverse ways on their respective drums for reverse movements, as above described; and I connect to the weight $m$ the rope or chain $n$—preferably having hand-grasp or grip-blocks $n'$—by which a quick elevation of the cage may be secured to carry firemen to any part of the building as needed; and I also connect to the cage the rope or chain $f'$, which reaches the ground for pulling the empty cage down and holding it steadily at any desired point.

Adjoining one of the drums $c$, I fix to the shaft $b$ a strap or band, $p$, being suitably fastened at one end, so as to be drawn tightly upon said drum with varying force, as required, by pulling upon the cord or chain $q$ of the band for a friction-brake to regulate the speed of descent of the loaded cage or to stop it at any desired elevation, the chain $q$ being placed conveniently for operation by an occupant of the cage, or from the windows of the building, or from the ground, and the chain $q$ may have hand-grasp or grip-blocks $r$ at intervals along it for its more effective operation.

To provide a safe means of reaching the cage from an opening of the building, I have arranged a platform or bridge, $s$, by hinging it at $t$ to the edge of the floor $f$ of the cage, to open outwardly or toward the building for entrance into a window, to rest upon the window-sill for a safe passage of persons and goods from the building to the cage, as will be understood from Fig. 2, and upon releasing the brake for further descent of the cage, the bridges $s$ will be automatically folded up vertically to the position of Fig. 1 to be fastened against the side or bars $h$ of the cage by any approved self-acting spring-clips or fastenings $u$, secured either to the cage or bridge, as will readily be understood.

Thus arranged, my improved fire-escape may be cheaply made and set up, is quick and effective in operation, and the entire apparatus being made of metal, it is practically fireproof, and the simplicity of its working parts is a safeguard against derangement, so that it is always in order when required for use, and these qualities make it very desirable as an elevator or lift for the carriage of merchandise in bulk or packages, for which service the apparatus is very well adapted.

Having thus described my invention, I claim as new and desire to secure by Letters Patent—

1. The combination of the bracket-arms $a$, the shaft $b$, journaled therein and carrying grooved drums $c\ c\ o\ k$, the band $p$, the cord $q$, having grip-blocks $r$, the ropes or chains $d\ l$, wound in reverse directions, and the cage $e$, formed of floor $f$ and frame $g$, connected by bolts and nuts, as shown and described.

2. The combination, with the cage-floor $f$, of a bridge, $s$, hinged to said floor so as to open outwardly, and the self-acting spring-clips $u$, whereby the bridge will fold up automatically at the time and in the manner set forth.

MICHAEL COLLINS.

Witnesses:
WM. P. FOWLER,
CHAS. ATWATER.